(12) United States Patent
Kanzaki

(10) Patent No.: US 11,193,011 B2
(45) Date of Patent: Dec. 7, 2021

(54) PROPYLENE-BASED RESIN COMPOSITION AND INJECTION-MOLDED OBJECT THEREOF

(71) Applicant: Sumitomo Chemical Company, Limited, Tokyo (JP)

(72) Inventor: Susumu Kanzaki, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 26 days.

(21) Appl. No.: 16/307,745

(22) PCT Filed: Jun. 6, 2017

(86) PCT No.: PCT/JP2017/020952
§ 371 (c)(1),
(2) Date: Dec. 6, 2018

(87) PCT Pub. No.: WO2017/213125
PCT Pub. Date: Dec. 14, 2017

(65) Prior Publication Data
US 2019/0264015 A1  Aug. 29, 2019

(30) Foreign Application Priority Data

Jun. 7, 2016 (JP) .............................. JP2016-113280

(51) Int. Cl.
| | | |
|---|---|---|
| C08L 23/12 | (2006.01) | |
| C08K 3/013 | (2018.01) | |
| C08K 5/00 | (2006.01) | |
| C08K 5/1575 | (2006.01) | |
| C08K 7/02 | (2006.01) | |
| C08L 23/10 | (2006.01) | |
| C08K 3/22 | (2006.01) | |
| C08K 5/01 | (2006.01) | |
| C08L 57/00 | (2006.01) | |

(52) U.S. Cl.
CPC .............. *C08L 23/12* (2013.01); *C08K 3/013* (2018.01); *C08K 5/0083* (2013.01); *C08K 5/1575* (2013.01); *C08K 7/02* (2013.01); *C08L 23/10* (2013.01); *C08K 3/22* (2013.01); *C08K 5/01* (2013.01); *C08K 2201/003* (2013.01); *C08L 57/00* (2013.01)

(58) Field of Classification Search
CPC ....... C08L 23/08; C08L 23/12; C08K 5/0083; C08K 5/1575
See application file for complete search history.

(56) References Cited

U.S. PATENT DOCUMENTS

| | | | | |
|---|---|---|---|---|
| 5,135,975 A * | 8/1992 | Rekers | ................. | C07D 493/04 524/108 |
| 5,198,484 A * | 3/1993 | Mannion | .............. | C08K 5/1575 524/108 |
| 6,238,615 B1 * | 5/2001 | Kobayashi | ................. | C08J 5/00 264/140 |
| 6,319,976 B1 * | 11/2001 | DeNicola, Jr. | ......... | C08F 255/00 524/504 |
| 2001/0040320 A1 | 11/2001 | Kobayashi et al. | | |
| 2007/0066733 A1 * | 3/2007 | Hanssen | ............. | C08L 2666/06 524/394 |
| 2012/0015170 A1 * | 1/2012 | Doshev | ................ | C08K 5/0083 428/220 |
| 2015/0353710 A1 | 12/2015 | Ayabe et al. | | |

FOREIGN PATENT DOCUMENTS

| | | |
|---|---|---|
| EP | 0265075 A2 | 4/1988 |
| JP | S52147652 A | 12/1977 |
| JP | S59066435 A | 4/1984 |
| JP | S63095252 A | 4/1988 |
| JP | H08283489 A | 10/1996 |
| JP | 2000143835 A | 5/2000 |
| JP | 2010077396 A | 4/2010 |
| JP | 2011074130 A | 4/2011 |
| JP | 2011074131 A | 4/2011 |
| JP | 2011256247 A | 12/2011 |

(Continued)

OTHER PUBLICATIONS

Stevens. Polymer Additives Part I. Journal of Chemical Education, p. 444-448. (Year: 1993).*

(Continued)

*Primary Examiner* — Michael M Dollinger
(74) *Attorney, Agent, or Firm* — Panitch Schwarze Belisario & Nadel LLP

(57) ABSTRACT

A propylene-based resin composition containing components (A), (B), and (C) is provided. The content of (A) is 50 to 89 parts by weight, the content of (B) is 11 to 50 parts by weight, and the content of (C) is 0.05 to 1 part by weight, based on 100 parts by weight of the total of (A) and (B). Component (A) is a propylene-based polymer, component (B) is a filler, and component (C) is a bis(3,4-dialkylbenzylidene)sorbitol represented by the formula (1)

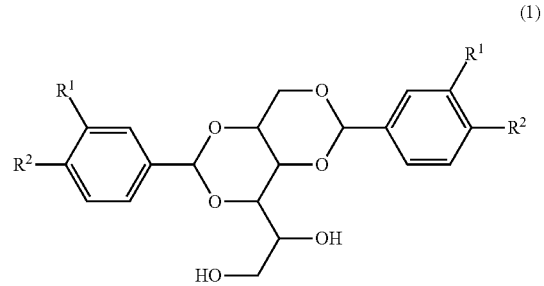

(1)

In formula (1), $R^1$ and $R^2$ each independently represent an alkyl group having 1 to 4 carbon atoms. It is possible to produce a molded article which has high rigidity and in which the linear expansion coefficients in the MD and the TD are small from the composition.

6 Claims, No Drawings

(56) References Cited

FOREIGN PATENT DOCUMENTS

| | | |
|---|---|---|
| JP | 2014058614 A | 4/2014 |
| JP | 2015096586 A | 5/2015 |
| WO | 99024496 A1 | 5/1999 |
| WO | 2006044187 A1 | 4/2006 |
| WO | 2012020106 A1 | 2/2012 |
| WO | 2014115385 A1 | 7/2014 |

OTHER PUBLICATIONS

Google Translation of JP 2011256247 (Year: 2021).*
Extended European Search Report dated Jan. 13, 2020 in EP Application No. 17810300.8.
Translation of International Preliminary Report on Patentability dated Dec. 11, 2018 in International Application No. PCT/JP2017/020952.
Translation of International Search Report dated Jul. 18, 2017 in International Application No. PCT/JP2017/020952.
Office Action dated Jan. 12, 2021 in JP Application No. 2018522500.
Office Action dated Sep. 1, 2020 in JP Application No. 2018522500.
Office Action dated Sep. 25, 2020 in CN Application No. 201780034949.5.
Office Action dated Apr. 22, 2021 in CN Application No. 201780034949.5.
Dingyi, H., "Polypropylene—Principle, Process and Technology," China Petrochemical Press, pp. 8-9 (2002).
Office Action dated Aug. 4, 2021 in CN Application No. 201780034949.5.

* cited by examiner

PROPYLENE-BASED RESIN COMPOSITION AND INJECTION-MOLDED OBJECT THEREOF

CROSS-REFERENCE TO RELATED APPLICATION

This application is a Section 371 of International Application No. PCT/JP2017/020952, filed Jun. 6, 2017, which was published in the Japanese language on Dec. 14, 2017 under International Publication No. WO 2017/213125 A1, and claims priority under 35 U.S.C. § 119(b) to Japanese Application No. 2016-113280, filed Jun. 7, 2016, the disclosures of which are incorporated herein by reference in their entirety.

TECHNICAL FIELD

The present invention relates to a propylene-based resin composition and an injection-molded article thereof.

BACKGROUND ART

Molded articles made of a propylene-based resin composition mainly based on a propylene-based resin have been used as automotive members and home appliance product members. In. molded articles to be used for these applications, high rigidity and dimension. stability are desired. In order to improve the dimension stability of molded articles made of a propylene-based resin composition, it is known to blend a nucleating agent in the propylene-based resin composition. As a propylene-based resin composition providing molded articles excellent in rigidity and dimension stability, for example, Patent Literature 1 discloses a propylene-based resin composition containing a specific propylene-ethylene block copolymer, a specific propylene-based polymer, a specific ethylene-α-olefin copolymer, a filler, and a nucleating agent.

CITATION LIST

Patent Literature

Patent Literature 1: Japanese Unexamined Patent Application Publication No. 2010-77396

SUMMARY OF INVENTION

Technical Problem

However, from the dimension stability of a molded article made of a propylene-based resin composition, a further improvement is required. Specifically, it is required to reduce the linear expansion coefficient of the molded article in the flow direction of the propylene-based resin composition (hereinbelow, referred to as the MD) in producing the molded article and simultaneously to reduce the linear expansion coefficient of the width direction (hereinbelow, referred to as the TD) perpendicular to the MD.

In consideration of the problem described above, it is an object of the present invention to provide a propylene-based resin composition enabling production of a molded article which has high rigidity and in which the linear expansion coefficient each in the MD and the TD is small.

Solution to Problem

The problem described above of the present invention has been solved by the following means.

That is, the present invention provides a propylene-based resin composition comprising the following component (A), the following component (B), and the following component (C), wherein based on the total weight of the component (A) and the component (B), which is taken as 100 parts by weight, the content of the component (A) is 50 to 89 parts by weight, the content of the component (B) is 11 to 50 parts by weight, and the content of the component (C) is 0.05 to 1 part by weight:

component (A): a propylene-based polymer
component (B): a filler
component (C): a bis(3,4-dialkylbenzylidene)sorbitol represented by the following formula (1)

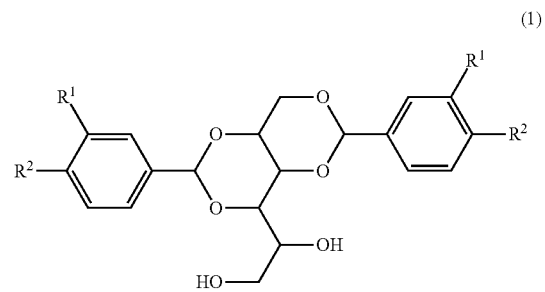

wherein $R^1$ and $R^2$ each independently of each other represent an alkyl group having 1 to 4 carbon atoms.

Advantageous Effects of Invention

According to the present invention, it is possible to provide a propylene-based resin composition enabling production of a molded article which has high rigidity and in which the linear expansion coefficient each in the MD and the TD is small.

DESCRIPTION OF EMBODIMENTS

Definitions

In the present description, the term "propylene-based resin composition" means a composition comprising a propylene-based polymer of more than 50% by weight and one or more other components.

In the present description, the term "filler" means particles that are formed from inorganic matter or an organic material such as a polymer insoluble in the composition and may be in various forms such as fibers, spheres, spheroids, and slices.

In the present description, the term "propylene-based polymer" means a polymer or copolymer that contains constituent units derived from propylene in a content of more than 50% by weight of the amount of the total constituent units.

In the present description, the term "inorganic filler" means a filler that is inorganic matter.

In the present description, the term "organic fiber" means a fiber mainly based on organic matter.

In the present description, the term "injection-molded article" means a molded article produced by an injection molding method.

[Propylene-Based Resin Composition]

The propylene-based resin composition according to the present invention (hereinbelow, the "propylene-based resin composition" is simply also referred to as the "resin composition") is a composition comprising the following component (A), the following component (B), and the following component (C):

component (A): a propylene-based polymer
component (B): a filler
component (C): a bis(3,4-dialkylbenzylidene)sorbitol represented by the following formula (1)

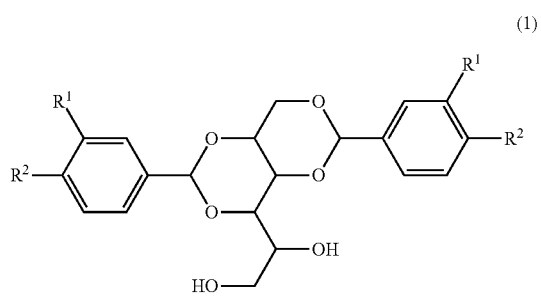

wherein $R^1$ and $R^2$ each independently of each other represent an alkyl group having 1 to 4 carbon atoms.

In the present invention, the description "lower limit to upper limit", which represents a numeric range, represents "lower limit or more and upper limit or less", that is, represents a numeric range including the upper limit and the lower limit.

Hereinbelow, each of the components will be described.

Component (A)

The component (A) in the present invention is a propylene-based polymer, which is a polymer having constituent units derived from propylene of more than 50% by weight based on the total amount of the polymer. Examples of the propylene-based polymer include propylene homopolymers and copolymers of propylene with another monomer. The resin composition according to the present invention may contain one propylene-based polymer or may contain two or more propylene-based polymers. The copolymer may be a random copolymer or may be a block copolymer. Hereinbelow, a random copolymer of propylene with another monomer is referred to as a "propylene-based random copolymer", and a block copolymer of propylene with another monomer is referred to as a "propylene-based block copolymer". From the viewpoint of the rigidity and impact resistance of a molded article made of the resin composition, a propylene homopolymer or a block copolymer of propylene with another monomer is preferred.

Examples of the propylene-based random copolymer include a random copolymer made of constituent units derived from propylene and constituent units derived from ethylene (hereinbelow, this may be denoted as the first random copolymer); a random copolymer made of constituent units derived from propylene and constituent units derived from an α-olefin other than propylene (hereinbelow, this may be denoted as the second random copolymer); and a random copolymer made of constituent units derived from propylene, constituent units derived from ethylene, and constituent units derived from an α-olefin other than propylene (hereinbelow, this may be denoted as the third random copolymer). In the present description, the term "α-olefin" means an organic compound including a carbon atom chain having a terminal carbon-carbon double bond (C=C) (or "an olefin having three or more carbon atoms and having a —CH=CH$_2$ group").

Examples of the propylene-based block copolymer include polymerization materials comprising a polymer component (I) comprising a propylene homopolymer or a polymer having constituent units derived from propylene of 50% by mass or more based on the amount of the total constituent units and a polymer component (II) comprising a copolymer of propylene with at least one comonomer selected from the group consisting of ethylene and α-olefins other than propylene.

In the propylene-based polymer of the component (A), from the viewpoint of the rigidity of the molded article made of the resin composition, the isotactic pentad fraction to be measured by $^{13}$C-NMR (may be denoted as a [mmmm] fraction) is preferably 0.97 or more, and more preferably 0.98 or more. It should be noted that the isotactic pentad fraction is a value to be determined by a measurement method described below. The closer to 1 the isotactic pentad fraction of the propylene-based polymer, the higher the stereoregularity of the molecular structure of the propylene-based polymer, and the higher the crystallinity of the propylene-based polymer.

Alternatively, when the component (A) is the above propylene-based random copolymer or the above propylene-based block copolymer, the isotactic pentad fraction is a value to be measured with respect to the linkage of propylene units in the copolymer.

In the propylene-based polymer of the component (A), the melt flow rate to be measured at 230° C. and under a load of 2.16 kgf compliance with HS K7210 (hereinbelow, the melt flow rate is denoted as MFR) is preferably 15 g/10 minutes or more, and more preferably 1.8 to 1.50 g/10 minutes, from the viewpoint of the fabricability of the resin composition.

It is possible to produce the propylene-based polymer of the component (A) using a polymerization catalyst by the following polymerization method.

Examples of the polymerization catalyst include Ziegler type catalyst systems, Ziegler-Natta type catalyst systems, catalyst systems composed of a compound having a cyclopentadienyl ring of a transition metal of Group 4 of the periodic table and an alkyl aluminoxane, catalyst systems composed of a compound having a cyclopentadienyl ring of a transition metal of Group 4 of the periodic table, a compound capable of reacting with the transition metal compound to form an ionic complex, and an organoaluminum compound, and catalyst systems prepared by making inorganic particles such as silica and clay mineral to support catalyst components such as a compound having a cyclopentadienyl ring of a transition metal of Group 4 of the periodic table, a compound to form an ionic complex, and an organoaluminum compound and modifying the inorganic particles. Preliminarily polymerized catalysts which are prepared by preliminarily polymerizing ethylene or an α-olefin in the presence of the above catalyst systems may also be used. Examples of the Ziegler-Matta type catalyst systems include catalyst systems in which a solid transition metal component containing titanium is used in combination with an organic metal component.

Examples of the above catalyst systems include catalyst systems described in Japanese Unexamined Patent Application Publication No. S61-218606, Japanese Unexamined Patent Application Publication No. H15-194685, Japanese Unexamined Patent Application Publication No. H7-216017, Japanese Unexamined Patent Application Publication No. H9-316147, Japanese Unexamined Patent Application Publication No. H10-212319, and Japanese Unexamined Patent Application Publication No. 2004-182981.

Examples of the polymerization method include bulk polymerization, solution polymerization, and gas phase polymerization. Herein, the bulk polymerization is a method in which polymerization is carried out using, as a medium, an olefin that is liquid at the polymerization temperature, and the solution polymerization is a method in which polymerization is carried out in an inert hydrocarbon solvent such as propane, butane, isobutane, pentane, hexane, heptane, and octane. The gas phase polymerization is a method in which, by using a gaseous monomer as a medium, a gaseous monomer is polymerized in the medium.

Examples of the polymerization mode include a batch system, a continuous system, and a combination thereof. The polymerization mode may be a multistage system to be performed using a plurality of polymerization reaction vessels linked in series.

It should be noted that the conditions of each polymerization step (polymerization temperature, polymerization pressure, monomer concentration, amount of catalyst to be placed, polymerization time, and the like) may be determined appropriately depending on the intended component (A).

In the production of the propylene-based polymer of the component (A), in order to remove a residual solvent contained in the obtained propylene-based polymer, ultra-low molecular weight oligomers, and the like by-produced during the production, the obtained propylene-based polymer may be retained at a temperature lower than the temperature at which the residual solvent, the oligomers, and the like may vaporize and the propylene-based polymer melts. Examples of a method for removing impurities such as the residual solvent and the oligomers include methods described in Japanese Unexamined Patent Application Publication No. S55-75410 and Japanese Patent No. 2565753.

<Propylene Homopolymer>

When the component (A) is a propylene homopolymer, from the viewpoint of making the fluidity of the resin composition in melting and the toughness of the molded article satisfactory, the limiting viscosity number of the propylene homopolymer to be measured in tetralin at 135° C. (hereinbelow, may be denoted as [η]) is preferably 0.1 to 2 dl/g, more preferably 0.5 to 1.5 dl/g, and still more preferably 0.7 to 1.4 dl/g.

The molecular weight distribution of the propylene homopolymer measured by gel permeation chromatography (hereinbelow, denoted as GPC) (hereinbelow, the molecular weight distribution may be denoted as Mw/Mn) is preferably 3 or more and less than 7, and more preferably 3 to 5.

<Propylene-Based Random Copolymer>

As mentioned above, examples of the propylene-based random copolymer are a random copolymer made of constituent units derived from propylene and constituent units derived from ethylene (i.e., a first random copolymer); a random copolymer made of constituent units derived from propylene and constituent units derived from an α-olefin other than propylene (i.e., a second random copolymer); and a random copolymer made of constituent units derived from propylene, constituent units derived from ethylene, and constituent units derived from an α-olefin other than propylene (i.e., a third random copolymer).

The α-olefin other than propylene constituting the above propylene-based random copolymer is preferably an α-olefin having 4 to 10 carbon atoms, examples of such α-olefins include 1-butene, 1-pentene, 1-hexene, 4-methyl-1-pentene, 1-octene, and 1-decene, and preferred are 1-butene, 1-hexene, and 1-octene.

Examples of the random copolymer made of constituent units derived from propylene and constituent units derived from an α-olefin other than propylene (i.e., the second random copolymer) include propylene-1-butene random copolymers, propylene-1-hexene random copolymers, propylene-1-octene random copolymers, and propylene-1-decene random copolymers.

Examples of the random copolymer made of constituent units derived from propylene, constituent units derived from ethylene, and constituent units derived from an α-olefin other than propylene (i.e., the third random copolymer) include propylene-ethylene-1-butene copolymers, propylene-ethylene-1-hexene copolymers, propylene-ethylene-1-octene copolymers, and propylene-ethylene-1-decene copolymers.

The content of the constituent units derived from ethylene in the first random copolymer, the content of the constituent units derived from an α-olefin other than propylene in the second random copolymer, and the total content of the constituent units derived from ethylene and the constituent units derived from an α-olefin other than propylene in third random copolymer are each preferably 0.1 to 40% by weight, more preferably 0.1 to 30% by weight, and still more preferably 2 to 15% by weight. Then, the content of the constituent units derived from propylene in these random copolymers is preferably 60 to 99.9% by weight, more preferably 70 to 99.9% by weight, and still more preferably 85 to 98% by weight.

<Propylene-Based Block Copolymer>

As mentioned above, the propylene based block copolymer in the present invention is a polymerization material comprising a polymer component (I) comprising a propylene homopolymer or a polymer comprising constituent units derived from propylene and a polymer component (II) comprising a copolymer of propylene with at least one comonomer selected from the group consisting of ethylene and α-olefins other than propylene. It is possible to produce the polymerization material by multistage polymerization including a polymerization step of an earlier stage of generating the polymer component (I) and a polymerization step of generating the polymer component (II) in the presence of the polymer component (1) generated in the earlier stage. It is possible to perform polymerization using a catalyst that can be used for production of the propylene-based random copolymer.

The polymer component (I) comprises a propylene homopolymer or a polymer comprising constituent units derived from propylene. Examples of the polymer comprising constituent units derived from propylene include propylene copolymers comprising units derived from at least one comonomer selected from the group consisting of ethylene and α-olefins other than propylene (preferably α-olefins having 4 to 10 carbon atoms) and units derived from propylene.

When the polymer component (I) comprises a polymer comprising constituent units derived from propylene, the content of the units derived from at least one comonomer is 0.01% by weight or more and less than 20% by weight in total, where the weight of the polymer component (I) is 100% by weight.

In α-olefins other than propylene, it is preferred that the number of carbon atoms be 4 to 10, and such α-olefins are more preferably 1-butene, 1-hexene, and 1-octene, and still more preferably 1-butene.

Examples of the polymer comprising constituent units derived from propylene that constitutes the polymer component (I) include propylene-ethylene copolymers, propylene-1-butene copolymers, propylene-1-hexene copolymers, propylene-1-octene copolymers, propylene-ethylene-1-butene copolymers, propylene-ethylene-1-hexene copolymers, and propylene-ethylene-1-octene copolymers.

Examples of the polymer component (I) preferably include propylene homopolymers, propylene-ethylene copolymers, propylene-1-butene copolymers, and propylene-ethylene-1-butene copolymers, and from the viewpoint of the rigidity of the molded article made of the resin composition, a propylene homopolymer is particularly preferred.

The polymer component (II) comprises a copolymer having constituent units derived from at least one comonomer selected from the group consisting of ethylene and α-olefins other than propylene and constituent units derived from propylene.

The content of the units derived from the at least one comonomer contained in the polymer component (II) is preferably 20 to 80% by weight, and more preferably 20 to 60% by weight, where the weight of the polymer component (II) is 100% by weight.

It is preferred that the α-olefin other than propylene constituting the polymer component (II) be an α-olefin having 4 to 10 carbon atoms, and examples of the α-olefin other than propylene include α-olefins similar to α-olefins other than propylene that may constitute the polymer component (I).

Examples of the copolymer constituting the polymer component (II) include propylene-ethylene copolymers, propylene-ethylene-1-butene copolymers, propylene-ethylene-1-hexene copolymers, propylene-ethylene-1-octene copolymers, propylene-ethylene-1-decene copolymers, propylene-1-butene copolymers, propylene-1-hexene copolymers, propylene-1-octene copolymers, and propylene-1-decene copolymer. Propylene-ethylene copolymers, propylene-1-butene copolymers, and propylene-ethylene-1-butene copolymers are preferred, and propylene-ethylene copolymers are more preferred.

The content of the polymer component (II) in the polymerization material comprising the polymer component (1) and the polymer component (II) is preferably 1 to 50% by weight, more preferably 1 to 40% by weight, still more preferably 5 to 30% by weight, and particularly preferably 8 to 15% by weight, where the weight of the polymerization material comprising the polymer component (I) and the polymer component (II) is 100% by weight.

When the polymer component (I) of the polymerization material is a propylene homopolymer, examples of the polymerization material include (propylene)-(propylene-ethylene) block copolymers, (propylene)-(propylene-ethylene-1-butene) block copolymers, (propylene)-(propylene-ethylene-1-hexene) block copolymers, (propylene)-(propylene-ethylene-1-octene) block copolymers, (propylene)-(propylene-1-butene) block copolymers, (propylene)-(propylene-1-hexene) block copolymers, (propylene)-(propylene-1-octene) block copolymers, and (propylene)-(propylene-1-decene) block copolymer.

When the polymer component (I) of the polymerization material is a propylene copolymer having constituent units derived from propylene of 50% by mass or more based on the amount of the total constituent units, examples of the polymerization material include (propylene-ethylene)-(propylene-ethylene) block copolymers, (propylene-ethylene)-(propylene-ethylene-1-butene) block copolymers, (propylene-ethylene)-(propylene-ethylene-1-hexene) block copolymers, (propylene-ethylene)-(propylene-ethylene-1-octene) block copolymers, (propylene-ethylene)-(propylene-ethylene-1-decene) block copolymers, (propylene-ethylene)-(propylene-1-butene) block copolymers, (propylene-ethylene)-(propylene-1-hexene) block copolymers, (propylene-ethylene)-(propylene-1-octene) block copolymers, (propylene-ethylene)-(propylene-1-decene) block copolymers, (propylene-1-butene)-(propylene-ethylene) block copolymers, (propylene-1-butene)-(propylene-ethylene-1-butene) block copolymers, (propylene-1-butene)-(propylene-ethylene-1-hexene) block copolymers, (propylene-1-butene)-(propylene-ethylene-1-octene) block copolymers, (propylene-1-butene)-(propylene-ethylene-1-decene) block copolymers, (propylene-1-butene)-(propylene-1-butene) block copolymers, (propylene-1-butene)-(propylene-1-hexene) block copolymers, (propylene-1-butene)-(propylene-1-octene) block copolymers, (propylene-1-butene)-(propylene-1-decene) block copolymers, (propylene-1-hexene)-(propylene-1-hexene) block copolymers, (propylene-1-hexene)-(propylene-1-octene) block copolymers, (propylene-1-hexene)-(propylene-1-decene) block copolymers, (propylene-1-octene)-(propylene-1-octene) block copolymers, and (propylene-1-octene)-(propylene-1-decene) block copolymers.

As the polymerization material comprising the polymer component (I) and the polymer component (if), (propylene)-(propylene-ethylene) block copolymers, (propylene)-(propylene-ethylene-1-butene) block copolymers, (propylene-ethylene)-(propylene-ethylene) block copolymers, (propylene-ethylene)-(propylene-ethylene-1-butene) block copolymers, and (propylene-1-butene)-(propylene-1-butene) block copolymers are preferred, and (propylene)-(propylene-ethylene) block copolymers are more preferred.

The limiting viscosity number of the polymer component (I) to be measured in tetralin at 135° C. (hereinbelow, may be denoted as [η]I) is preferably 0.1 to 2 dl/g, more preferably 0.5 to 1.5 dl/g, and still more preferably 0.7 to 1.3 dl/g.

The limiting viscosity number of the polymer component (II) to be measured in tetralin at 135° C. (hereinbelow, may be denoted as [η]II) is preferably 1 to 10 dl/g, more preferably 2 to 10 dl/g, and still more preferably 5 to 8 dl/g.

Additionally, the ratio of [η]II to [η]I ([η]II/[η]I) is preferably 1 to 20, more preferably 2 to 10, and still more preferably 2 to 9.

The limiting viscosity number (unit: dl/g) in the present invention is a value to be measured using tetralin and at a temperature of 135° C. by the following method.

The reduced viscosity was measured at three points of concentration of 0.1 dl/g, 0.2 dl/g, and 0.5 g/dl using an Ubbelohde type viscometer. The limiting viscosity number is determined by a method described in "Kobunshi yoeki, Kobunshi jikkengaku 11" (published by Kyoritsu Shuppan Co., Ltd. in 1982), page 491, that is, by an "extrapolation method" including plotting reduced viscosities for concentrations and then extrapolating the concentration to zero.

When the propylene-based polymer of the component (A) is a polymerization material comprising the polymer component (I) and the polymer component (II) formed by multistage polymerization, a portion of the polymer component formed in the polymerization of the earlier stage is extracted from the polymerization vessel where the polymerization was performed to determine the limiting viscosity number of the polymer component, the limiting viscosity number of the polymerization material finally obtained by the multistage polymerization (hereinbelow, denoted as [η]Total) is determined, and the limiting viscosity number of the polymer component formed in the polymerization of the latter stage is calculated using these limiting viscosity number values and the content of each polymer component.

Alternatively, when the polymerization material comprising the polymer component (I) and the polymer component (II) is produced by a method in which the polymer component (I) is obtained by the polymerization step of an earlier stage and the polymer component (II) is obtained in the polymerization step of a latter stage, the measurement and calculation procedure of the content and limiting viscosity number ([η]Total, [η]I, and [η]II) of each of the polymer component (I) and the polymer component (II) is as follows.

The limiting viscosity number [η]II of the polymer component (II) is calculated from the limiting viscosity number of the polymer component (I) obtained in the polymerization step of the earlier stage ([η]I), the limiting viscosity number of the final polymer measured by the above method after the polymerization step of the latter stage (i.e., the polymerization material comprising the polymer component (I) and the polymer component (II)) ([η]Total), and the content of the polymer component (II) contained in the final polymer by the following expression:

$$[\eta]II=([\eta]Total-[\eta]I\times XI)/XII$$

[η]Total: the limiting viscosity number of the final polymer (unit: dl/g)

[η]I: the limiting viscosity number of the polymer component (I) dl/g)

XI: the weight ratio of the polymer component (I) to the final polymer

XII: the weight ratio of the polymer component (II) to the final polymer.

It should be noted that XI and XII are calculated from the mass balance in the polymerizations.

The weight ratio XII of the polymer component (II) to the final polymer may be calculated using the heat of crystal fusion of each of the polymer component (I) and the final polymer by the following expression:

$$XII=1-(\Delta Hf)T/(\Delta Hf)P$$

(ΔHf)T: heat of fusion of the final polymer (the component (I) and the component (II)) (unit: cal/g)

(ΔHf)P: heat of fusion of the polymer component (I) (unit: cal/g).

The molecular weight distribution of the polymer component (I) measured by GPC (Mw/Mn) is preferably 3 or more and less than 7, and more preferably 3 to 5.

Component (B)

The component (B) is a filler, and the filler includes an inorganic filler and an organic filler. The propylene resin composition of the present embodiment may contain one filler or may contain two or more fillers.

Examples of the inorganic filler include glass, silicate minerals, alumina, silica, silicon dioxide, titanium oxide, iron oxide, aluminum oxide, magnesium oxide, antimony oxide, barium ferrite, strontium ferrite, beryllium oxide, magnesium hydroxide, aluminum hydroxide, basic magnesium carbonate, calcium carbonate, magnesium carbonate, carbonate minerals, calcium sulfate, magnesium sulfate, basic magnesium sulfate, calcium sulfite, carbon black, and cadmium sulfide.

Examples of the organic filler include polyesters, aromatic polyamides, cellulose, and vinylon.

The shape of the filler may be plate-like, may be needle-like, or may be fibrous.

As the filler, from the viewpoint of improving the impact resistance in addition to the rigidity of the molded article and reducing the linear expansion coefficient, talc and basic magnesium sulfate fibers are preferred. Additionally, from the viewpoint of improving the impact resistance and reducing the weight in addition to the rigidity of the molded article, the filler is preferably an organic fiber.

When the component (B) is a talc, from the viewpoint of the rigidity, impact resistance, and linear expansion coefficient of the molded article, the average particle size of the talc is preferably 5 μm or less. The "average particle size" herein means a particle size when the number of particles accumulated from the smaller particle size side reaches 50%, in the measurement data of the particle size distribution on a volume basis measured by the laser diffraction method. The average particle size thus defined may be generally referred to as the "particle size corresponding to 50%" and denoted as D50 hereinbelow.

When the component (B) is a basic magnesium sulfate fiber, from the viewpoint of the rigidity; impact resistance, and linear expansion coefficient of the molded article, the average fiber length of the basic magnesium sulfate fiber is preferably 5 to 50 μm, and more preferably 10 to 30 μm. The average fiber diameter of the basic magnesium sulfate fiber is preferably 0.3 to 2 μm, and more preferably 0.5 to 1 μm.

When the component (B) is a fiber, a bundling agent may be used in order to bundle the fiber. Examples of the bundling agent include polyolefin resins, polyurethane resins, polyester resins, acrylic resins, epoxy-based resins, starch, and vegetable oil. The bundling agent may contain a modified polyolefin resin, a surface treatment agent, and a lubricant such as paraffin wax.

Examples of the modified polyolefin resin include resins obtained by modifying a polyolefin resin with an unsaturated carboxylic acid and/or unsaturated carboxylic acid derivate. The polyolefin resin, which is a raw material of the modified polyolefin resin, is a resin comprising a homopolymer of one olefin or a copolymer of two or more olefins. In other words, the modified polyolefin resin is a resin generated by reacting a homopolymer of one olefin or a copolymer of two or more olefins with an unsaturated carboxylic acid and/or unsaturated carboxylic acid derivative, the resin having a partial structure derived from the unsaturated carboxylic acid or unsaturated carboxylic acid derivative in the molecule thereof. Specifically, examples include the following modified polyolefin resins (a) to (c). The resin composition of the present invention may contain one modified polyolefin resin or may contain two or more modified polyolefin resins:

(a): a modified polyolefin resin obtained by graft-polymerizing an unsaturated carboxylic acid and/or unsaturated carboxylic acid derivative to a homopolymer of an olefin;

(b): a modified polyolefin resin obtained by graft-polymerizing an unsaturated carboxylic acid and/or unsaturated carboxylic acid derivative to a copolymer obtained by copolymerizing two or more olefins; and (c): a modified polyolefin resin obtained by graft-polymerizing an unsaturated carboxylic acid and/or unsaturated carboxylic acid derivative to a block copolymer obtained by copolymerizing two or more olefins after homopolymerizing an olefin.

Examples of the above unsaturated carboxylic acid include maleic acid, fumaric acid, itaconic acid, acrylic acid, and methacrylic acid.

Examples of the unsaturated carboxylic acid derivative include acid anhydrides, ester compounds, amide compounds, imide compounds, and metal salts of unsaturated carboxylic acids. Specific examples of the unsaturated carboxylic acid derivative include maleic anhydride, itaconic anhydride, methyl acrylate, ethyl acrylate, butyl acrylate, methyl methacrylate, ethyl methacrylate, butyl methacrylate, 2-hydroxyethyl methacrylate, maleic acid monoethyl ester, maleic acid diethyl ester, fumaric acid monomethyl ester, fumaric acid dimethyl ester, acrylamide, methacrylamide, maleic acid monoamide, maleic acid diamide, fumaric acid monoamide, maleimide, N-butylmaleimide, and sodium methacrylate.

As the unsaturated carboxylic acid, maleic acid and acrylic acid are preferred, and as the unsaturated carboxylic acid derivative, maleic anhydride and 2-hydroxyethyl methacrylate are preferred.

The above modified polyolefin resin is preferably above (c). More preferred is a modified polyolefin resin obtained by graft-polymerizing maleic anhydride to a polyolefin resin containing units derived from ethylene and/or propylene as its main constituent units.

The content of the constituent units derived from an unsaturated carboxylic acid and/or unsaturated carboxylic acid derivative to be contained in the modified polyolefin resin is preferably 0.1% by weight to 20% by weight, and more preferably 0.1% by weight to 10% by weight, from the viewpoint of the rigidity and hardness of a molded article to be obtained from the resin composition, where the amount of the modified polyolefin resin is 100% by weight. As the content of the constituent units derived from the unsaturated carboxylic acid and/or unsaturated carboxylic acid derivative, a value obtained by calculation after quantifying the absorption attributable to the unsaturated carboxylic acid and/or unsaturated carboxylic acid derivative is used using an infrared absorption spectrum or an NMR spectrum.

The graft efficiency of the unsaturated carboxylic acid and/or unsaturated carboxylic acid derivative of the modified polyolefin resin is preferably 0.51 or more, from the viewpoint of the rigidity and impact strength of the molded article obtained from the resin composition. The "graft efficiency of the modified polyolefin resin" means a "ratio of the amount of the unsaturated carboxylic acid and/or unsaturated carboxylic acid derivative chemically bonded to the resin to the total amount of the unsaturated carboxylic acid and/or unsaturated carboxylic acid derivative not chemically bonded to the resin and the unsaturated carboxylic acid and/or unsaturated carboxylic acid derivative chemically bonded to the resin contained in the modified polyolefin resin". The graft efficiency in the graft polymerization of the unsaturated carboxylic acid and/or unsaturated carboxylic acid derivative can be determined by the following procedure (1) to (9);

(1) In 100 ml of xylene, 1.0 g of a modified polyolefin resin is dissolved;
(2) The xylene solution is added dropwise under stirring to 1000 ml of methanol to reprecipitate the modified polyolefin resin;
(3) The reprecipitated modified polyolefin resin is collected;
(4) The collected modified polyolefin resin is dried in a vacuum at 80° C. for 8 hours to obtain a purified modified polyolefin resin;
(5) The purified modified polyolefin resin is heat pressed to produce a film having a thickness of 100 μm;
(6) An infrared absorption spectrum of the film is measured;
(7) The absorption attributable to the unsaturated carboxylic acid and/or unsaturated carboxylic acid derivative is quantified from the infrared absorption spectrum, and the content of the unsaturated carboxylic acid and/or unsaturated carboxylic acid derivative that has been reacted with the polyolefin resin in the modified polyolefin resin (X1) is calculated;

(8) Separately, a modified polyolefin resin not purified is subjected to the above procedure (5) to (6), and the content of the unsaturated carboxylic acid and/or unsaturated carboxylic acid derivative in the modified polyolefin resin that has not been purified (X2) is calculated from the infrared absorption spectrum thereof (X2 is the total of the content of the unsaturated carboxylic acid and/or unsaturated carboxylic acid derivative reacted with the polyolefin resin (X1) and the content of the unsaturated carboxylic acid and/or unsaturated carboxylic acid derivative not reacted with the polyolefin resin (i.e., free)); and
(9) The graft efficiency is calculated by the expression: graft efficiency=X1/X2.

The MFR of the modified polyolefin resin is preferably 5 to 400 g/10 minutes, more preferably 10 to 200 g/10 minutes, and particularly preferably 20 to 150 g/10 minutes, from the viewpoint of the mechanical strength and production stability. It should be noted that the MFR is a value measured at 230° C. and under a load of 2.16 kgf according to JIS K7210.

Component (C)

The component (C) in the present invention is a bis(3,4-dialkylbenzylidene)sorbitol represented by the following formula (1) and functions as a nucleating agent:

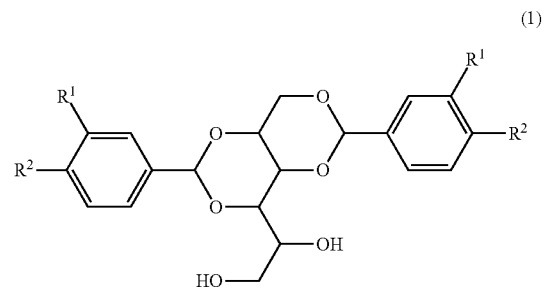

(1)

wherein $R^1$ and $R^2$ each independently of each other represent an alkyl group having 1 to 4 carbon atoms.

Preferably, all of $R^1$ and $R^2$ in the above formula (1) are methyl groups.

[Resin Composition]

The resin composition according to the present invention contains the above component (A), component (B) and component (C). Based on the total weight of the above component (A) and the above component (B), which is taken as 100 parts by weight, the content of the component (A) is 50 to 89 parts by weight, preferably 60 parts by weight or more from the viewpoint of the fabricability of the resin composition, preferably 85 parts by weight or less from the viewpoint of the dimension stability of the molded article. The content of the component (B) is 11 to 50 parts by weight, preferably 15 parts by weight or more from the viewpoint of the rigidity and dimension stability of the molded article, preferably 40 parts by weight or less from the viewpoint of the fabricability of the resin composition. The content of the component (C) is 0.05 to 1.0 parts by weight, preferably 0.1 part by weight or more from the viewpoint of the rigidity and dimension stability of the molded article, preferably 0.5 parts by weight or less from the viewpoint of the appearance, odor, and impact resistance of the molded article.

The total content of the above component (A), component (B) and component (C) contained in the resin composition is preferably 70% by weight or more, more preferably 85% by weight or more, and still more preferably 90% by weight or more, based on the total weight of the resin composition according to the present invention, which is taken as 100% by weight.

The MFR of the resin composition according to the present invention (measured at 230° C. and under a load of 2.16 kgf in compliance with MS K7210) is preferably 15 g/10 minutes or more from the viewpoint of the fabricability of the resin composition.

The resin composition according to the present invention is obtained by melt-kneading each raw material component at preferably 180° C. or more, more preferably 180 to 300° C., and still more preferably 180 to 250° C. For the melt-kneading, for example, a Banbury mixer, a single screw extruder, a twin screw co-rotating extruder, and the like can be used.

Examples of the shape of the resin composition according to the present invention include a strand-like shape, a sheet-like shape, a flat plate-like shape, and a pellet-like shape, which is obtained by cutting a strand at an appropriate length. In order to fabricate the resin composition of the present invention, from the viewpoint of the production stability of a molded article to be obtained, the shape of the resin composition before fabricated into the molded article is preferably a pellet-like shape of which length is 1 to 50 mm.

In the resin composition according to the present invention, when the component (B) is fibers, it is preferred that all the fibers have a length of 2 mm or more and are aligned substantially in parallel in the resin composition. In order to provide an injection-molded article excellent in injection moldability and of high strength, it is preferred that the resin composition according to the present invention be a pellet having a length of 2 to 50 mm and, inside the pellet, fibers having the same length as that of the pellet be aligned substantially in parallel. Pellets having such a structure are referred to hereinbelow as "long fiber-containing pellets". Long fiber-containing pellets can be obtained according to the method described in Japanese Unexamined Patent Application Publication No. H3-121146.

The resin composition according to the present invention is prepared by kneading raw material components. The kneading order of each raw material component is not particularly limited, but it is preferred to blend and knead each raw material component according to the following methods:

Method 1: a method of kneading the component (A), component (B) and component (C) together;

Method 2: a method of kneading a portion of the component (A) and the component (B), and then, kneading the obtained kneaded product, the remainder of the component (A), and the component (C); and Method 3: a method of kneading and pelletizing the component (A) and component (C), and then, kneading the obtained pellets and the component (B).

The resin composition according to the present invention may contain additives. Examples of the additive include a neutralizer, an antioxidant, a UV absorber, a slip agent, an antistatic agent, an antiblocking agent, a processing aid, an organic peroxide, a coloring agent (inorganic pigment, organic pigment, or the like), a pigment dispersant, a foaming agent, a foam nucleating agent, a plasticizer, a flame retardant, a crosslinking agent, a crosslinking aid, a brightening agent, an antibacterial agent, and a light diffusing agent. The resin composition according to the present invention may contain one additive or may contain two or more additives.

The resin composition according to the present invention may contain an elastomer component. The content of the elastomer component contained in the resin composition is preferably 0 to 30% by weight, and more preferably 5 to 30% by weight, based on the total weight of the resin composition according to the present invention, which is taken as 100% by weight. An example of the elastomer component is a random copolymer having constituent units derived from ethylene and constituent units derived from an α-olefin having 4 to 10 carbon atoms. The MFR of the random copolymer measured at 230° C. and under a load of 2.16 kgf in compliance with JIS K7210 is preferably 0.1 to 50 g/10 minutes.

Examples of the α-olefin having 4 to 10 carbon atoms that constitutes the above random copolymer include α-olefins similar to α-olefins having 4 to 10 carbon atoms that may constitute the component (A). Specific examples thereof include α-olefins having a chain structure such as 1-butene, 1-pentene, 1-hexene, 4-methyl-1-pentene, 1-octene, and 1-decene and α-olefins having a cyclic structure such as vinylcyclopropane and vinylcyclobutane, and 1-butene, 1-hexene, and 1-octene are preferred.

Specific examples of the above random copolymer include ethylene-1-butene random copolymers, ethylene-1-hexene random copolymers, ethylene-1-octene random copolymers, ethylene-1-decene random copolymers, ethylene-(3-methyl-1-butene) random copolymers, and copolymers of ethylene and an α-olefin having a cyclic structure.

The content of the α-olefin contained in the above random copolymer is preferably 1 to 49% by weight, more preferably 5 to 49% by weight, and still more preferably 24 to 49% by weight, where the weight of the above random copolymer is 100% by weight.

From the viewpoint of improving the impact resistance of the molded article, the density of the above random copolymer is 0.850 to 0.890 g/cm$^3$, more preferably 0.850 to 0.880 g/cm$^3$, and still more preferably 0.855 to 0.867 g/cm$^3$.

It is possible to produce the above random copolymer by polymerizing monomers using a polymerization catalyst. Examples of the polymerization catalyst include homogeneous catalyst systems such as metallocene catalysts and Ziegler-Natta type catalyst systems.

Examples of the homogeneous catalyst systems include catalyst systems composed of a compound having a cyclopentadienyl ring of a transition metal of Group 4 of the periodic table and an alkyl aluminoxane, catalyst systems composed of a compound having a cyclopentadienyl ring of a transition metal of Group 4 of the periodic table, a compound capable of reacting with the transition metal compound to form an ionic complex, and an organoaluminum compound, and catalyst systems prepared by making inorganic particles such as silica and clay mineral to support catalyst components such as a compound having a cyclopentadienyl ring of a transition metal of Group 4 of the periodic table, a compound to form an ionic complex, and an organoaluminum compound and modifying the inorganic particles, and additionally, include preliminarily polymerized catalyst systems which are prepared by preliminarily polymerizing ethylene or an α-olefin in the presence of the above catalyst systems.

Example of the Ziegler-Natta type catalyst systems include catalyst systems in which a solid transition metal component containing titanium is used in combination with an organic metal component.

As the above random copolymer, a commercially available products may be used. Examples of commercially available products that can be used as the random copolymer include ENGAGE (registered trademark) manufactured by Dow Chemical Japan Ltd., TAFMER (registered trademark) manufactured by Mitsui Chemicals, Inc., NEO-ZEX (registered trademark) and ULTZEX (registered trademark) manufactured by Prime Polymer Co., Ltd., and EXCELLEN FX (registered trademark), SUMIKATHENE (registered trademark), and ESPRENE SPO (registered trademark) manufactured by Sumitomo Chemical Company, Limited.

It is possible to obtain molded article by molding the resin composition according to the present invention. The molded article is preferably an injection-molded article produced by the injection molding method. Examples of the injection molding method includes methods such as the common injection molding method, injection foam molding method, supercritical injection foam molding method, ultra-high-speed injection molding method, injection compression molding method, gas assist injection molding method, sandwich molding method, sandwich foam molding method, and insert/outsert molding method.

The flexural modulus of an injection-molded article according to the present invention at 23° C. is preferably 2,000 MPa or more, more preferably 2,800 MPa or more, and still more preferably 3,000 to 5,000. MPa, from the viewpoint of the rigidity of the molded article. It is possible to control the flexural modulus of the injection-molded article by adjusting the amount of the filler to be added.

Examples of applications of the injection-molded article according to the present invention include automotive members, home appliance product members, and containers. Of these, the object is suitable for automotive interior and exterior parts.

EXAMPLES

Hereinbelow, the present invention will be described with reference to Examples and Comparative Examples. The propylene-based polymer, filler, nucleating agent, and additives used in Examples and Comparative Examples are given below.

(1) Component (A)
(A-1) Propylene Homopolymer

The propylene homopolymer was produced by the gas phase polymerization method, using a polymerization catalyst obtained by the method described in Example 1 of Japanese Unexamined Patent Application Publication No. 2004-182981, under conditions such that a propylene-based polymer of the following physical properties can be obtained.

MFR (measured at 230° C. and under a load of 2.16 kgf): 19 g/10 minutes
Limiting viscosity number ([η]): 1.34 dl/g
Isotactic pentad fraction: 0.980
(A-2) Propylene Homopolymer
MFR (measured at 230° C. and under a load of 2.16 kg): 120 g/10 minutes
Limiting viscosity number ([η]): 0.92 dl/g
Isotactic pentad fraction: 0.985
(A-3) (Propylene)-(propylene-ethylene) Block Copolymer
Polymerization material comprising a propylene homopolymer component and a propylene-ethylene copolymer component
MFR (at 230° C. and under a load of 2.16 kgf): 50 g/10 minutes
Limiting viscosity number of the propylene homopolymer component ([η]I): 0.87 dl/g
Limiting viscosity number of the propylene-ethylene copolymer component ([η]II): 6.26 dl/g Isotactic pentad fraction: 0.984
The content of the propylene-ethylene copolymer component: 12.4% by weight
The ethylene content in the propylene-ethylene copolymer component: 39.4% by weight
(2) Component (B)
(B-1) Talc
Talc manufactured by HAYASHI KASEI CO., LTD.
Average particle size (particle size corresponding to 50% D50 measured by the laser diffraction method): 4.4 μm
(B-2) Basic Magnesium Sulfate Fiber
MOS-HIGE A manufactured by Ube Material Industries, Ltd.
(fibrous basic magnesium sulfate) was used. The average fiber diameter was 0.5 the average fiber length was 10 μm, and the average aspect ratio was 20.
(B-3) Aramid Fiber
Aramid fiber manufactured by TEIJIN LIMITED
Fiber diameter: 12 μm
(3) Component (C)
(C-1) Nucleating Agent-1
1,3:2,4-Bis(3,4-dimethylbenzylidene)sorbitol
(Millad3988 manufactured by Milliken Japan K.K.)
(C-2) Nucleating Agent-2
A nucleating agent containing disodium=(1R,2R,3S,4S)-bicyclo[2.2.1]heptan-2,3-dicarboxylate as the main component
(Hyperform HPN-68L manufactured by Milliken Japan K.K. The content of disodium=(1R,2R,3S,4S)-bicyclo[2.2.1]heptan-2,3-dicarboxylate in HPN-68L: 80% by weight)
(C-3) Nucleating Agent-3
A nucleating agent containing 1,2-cyclohexane-dicarboxylic acid calcium salt as the main component
(Hyperform HPN-20E manufactured by Milliken Japan K.K. The content of 1,2-cyclohexane-dicarboxylic acid calcium salt in HPN-20E: 66% by weight)
(C-4) Nucleating Agent-4
Sodium 2,2'-methylene bis(4,6-di-tert-butylphenyl)phosphate
(ADEKA STAB NA-11 manufactured by ADEKA. CORPORATION)
(C-5) Nucleating Agent-5
Sodium benzoate
(Sodium benzoate 20M manufactured by Ciba Specialty Chemicals Inc.)
(4) Maleic Anhydride-Modified Polypropylene Resin
MFR (measured at 230° C. and under a load of 2.16 kgf)): 100 g/10 minutes,
Amount of maleic anhydride grafted=0.43% by weight
It should be noted that the above maleic anhydride-modified polypropylene resin was produced according to the method described in Example 1 of Japanese Unexamined Patent Application Publication No. 2004-197068. In this case, the amount of unreacted maleic anhydride was 0.2% by weight based on the modified polypropylene resin, and the graft efficiency is 0.68.

The physical properties of the raw material components and resin compositions were measured according to the methods as follows.
(1) Melt Flow Rate (MFR, Unit: g/10 Minutes)
The melt flow rate was measured according to the method specified in JIS K7210.
The measurement temperature was 230° C. and the measurement load was 2.16 kgf.

(2) Limiting Viscosity Number ([η], Unit: Dl/g)

The reduced viscosity was measured at three points of concentration of 0.1, 0.2 and 0.5 g/dl using an Ubbelohde type viscometer. The reduced viscosity was measured using tetralin as the solvent at a temperature of 135° C. The limiting viscosity number was determined by the extrapolation method including plotting reduced viscosities for concentrations and then extrapolating the concentration to zero.

(3) Production of Injection-Molded Article (1)

Injection-molded articles used for measurement of the flexural modulus and linear expansion coefficient in Examples 1 to 2, Comparative Examples 1 to 10, and Comparative Examples 14 to 17 were produced in according to the following method.

As the injection molding apparatus, PLASTAR Si30, of which mold clamping force is 30 tons, manufactured by TOYO MACHINERY & METAL CO., LTD. was used. Strip-like injection-molded articles of 80 mm×10 mm×4 mm (thickness) were produced under conditions of a molding temperature of 230° C., an injection speed of 20 mm/sec, and a mold temperature of 50° C. and used for measurement.

(4) Production of Injection-Molded Article (2)

Injection-molded articles used for measurement of the flexural modulus and linear expansion coefficient in Example 3 and Comparative Examples 11 to 13 were produced in according to the following method.

As the injection molding apparatus, J150E, of which mold clamping force is 150 tons, manufactured by The Japan Steel Works, Ltd. was used. As the screw of the injection molding apparatus, a deep groove type was used. Strip-like injection-molded articles of 127 mm×12.7 mm×3.2 mm (thickness) were produced under conditions of a molding temperature of 220° C., an injection speed of 20 mm/sec, and a mold temperature of 50° C. and used for measurement.

(5) Flexural Modulus (1) (FM, Unit: MPa)

The flexural modulus of the injection-molded article was measured according to the method specified in HS K7203. Specifically, a specimen of which thickness was 4.0 mm, molded according to the method of the above Production of injection-molded article (1) was used to measure the flexural modulus at a span length of 64 mm, a load speed of 2.0 mm/minute, and a measurement temperature of 23° C.

(6) Flexural Modulus (2) (FM, Unit: MPa)

The flexural modulus of the injection-molded article was measured according to the method specified in JIS K7203. Specifically, a specimen of which thickness was 3.2 mm, molded according to the method of the above Production of injection-molded article (2) was used to measure the flexural modulus at a span length of 50 mm, a load speed of 2.0 mm/minute, and a measurement temperature of 23° C.

(8) Linear Expansion Coefficient (Unit=1/° C.)

A thermal mechanical analysis apparatus TMA/SS6100 manufactured by SII NanoTechnology Inc. was used to perform measurement as follows.

A specimen of which size was 10 mm×10 mm×4.0 mm or 10 mm×10 mm×3.2 mm was cut out from the central part in the longitudinal direction of an injection-molded article produced according to the method of the above Production of injection-molded article (1) or (2). The specimen was set in the above apparatus, and the temperature was raised at a temperature rising rate of 5° C./minute from −30° C. to 130° C. to remove the residual strain in the molding. Thereafter, the specimen was set again in the apparatus so as to allow measurement of the dimensional change in the MD (flow direction of the resin) or the TD (direction perpendicular to the MD) in the injection molding, and the dimension at 23° C. was accurately measured. The temperature was raised at a temperature rising rate of 5° C./minute from −30° C. to 80° C., during which the dimensional change each in the MD and the TD was measured. The dimensional change per unit length and unit temperature was determined as the linear expansion coefficient. The smaller the linear expansion coefficient, the more satisfactory the dimension stability.

Examples 1 and 4 and Comparative Examples 1 to 5 and 16 to 18

After the propylene homopolymer (A-1), talc (B-1), and a nucleating agent each in an amount shown in Table 1, 5, or 6, and additionally 0.05 parts by weight of calcium stearate, 0.05 parts by weight of 3,9-bis[2-{3-(3-t-butyl-4-hydroxy-5-methylphenyl)propionyloxy}-1,1-dimethylethyl]-2,4,8,10-tetraoxaspiro[5.5]undecane (SUMILIZER GA-80 manufactured by Sumitomo Chemical Company, Limited), and 0.10 parts by weight of bis(2,4-di-t-butylphenyl) pentaerythritol diphosphite (ULTRANOX U626 manufactured by GE Specialty Chemicals Inc.) based on the total amount of 100 parts by weight of (A-1) and (B-1) were homogeneously mixed, the obtained mixture was kneading extruded using a twin-screw kneading extruder (model 2D25-S manufactured by Toyo Seiki Seisaku-sho, Ltd.) at an amount extruded of 3 kg/hr, 220° C., and a number of screw revolutions of 70 rpm to produce a resin composition. The physical properties of the obtained resin compositions are shown in the following Table 1, 5 or 6.

Example 2 and Comparative Examples 6 to 10

After the propylene homopolymer (A-1), a basic magnesium sulfate fiber (B-2), and a nucleating agent each in an amount shown in Table 2, and additionally 0.05 parts by weight of calcium stearate, 0.05 parts by weight of 3,9-bis[2-{3-(3-t-butyl-4-hydroxy-5-methylphenyl)propionyloxy}-1,1-dimethylethyl]-2,4,8,10-tetraoxaspiro[5.5]undecane (SUMILIZER GA80 manufactured by Sumitomo Chemical Company, Limited), and 0.10 parts by weight of bis (2,4-di-t-butylphenyl)pentaerythritol diphosphite (ULTRANOX U626 manufactured by GE Specialty Chemicals Inc.) based on the total amount of 100 parts by weight of (A-1) and (B-2) were homogeneously mixed in a tumbler, the obtained mixture was kneading extruded using a twin-screw kneading extruder (model TEX44αII-49BW-3V manufactured by The Japan Steel Works, Ltd.) at an amount extruded of 70 kg/hr, 200° C., and a number of screw revolutions of 300 rpm and under vent suction to produce a resin composition. The physical properties of the obtained resin compositions are shown in the following Table 2.

Example 3 and Comparative Examples 11 to 13

Fiber-containing pellets of which pellet length was 9 mm were produced according to the method described in Japanese Unexamined Patent Application Publication No. H3-121146, with the compositions shown in Table 3. It should be noted that the production of the fiber-containing pellets was performed at an impregnation temperature of 220° C. and a take-up speed of 13 m/minute. That is, while the aramid fiber (B-3) was pulled through a crosshead die of which passage had been corrugated, the aramid fiber was impregnated with a mixture comprising the propylene homopolymer (A-2), the maleic anhydride-modified polypropylene resin, a nucleating agent, and additives blended in the same manner as in Example 1 fed from the extruder connected to the crosshead die. Then, the fiber was taken up as a strand through a shaping die, the strand was shredded to obtain the resin composition as fiber-containing pellets. The physical properties of the obtained resin compositions are shown in the following Table 3.

Comparative Examples 14 and 15

After the propylene homopolymer (A-1) and a nucleating agent each in an amount shown in Table 4, and additionally 0.05 parts by weight of calcium stearate, 0.05 parts by weight of 3,9-bis[2-{3-(3-t-butyl-4-hydroxy-5-methylphenyl)propionyloxy}-1,1-dimethylethyl]-2,4,8,10-tetraoxaspiro[5.5]undecane (SUMILIZER GA80 manufactured by Sumitomo Chemical Company, Limited), 0.10 parts by weight of bis (2,4-di-t-butylphenyl)pentaerythritol diphosphite (ULTRANOX U626 manufactured by GE Specialty Chemicals Inc.) based on 100 parts by weight of (A-1) were homogeneously mixed, the obtained mixture was kneading extruded using a twin-screw kneading extruder (model 2D25-S manufactured by Toyo Seiki Seisaku-sho, Ltd.) at an amount extruded of 3 kg/hr, 220° C., and a number of screw revolutions of 70 rpm to produce a resin composition. The physical properties of the obtained resin compositions are shown in the following Table 4.

TABLE 1

|  | Example 1 | Comparative Example 1 | Comparative Example 2 | Comparative Example 3 | Comparative Example 4 | Comparative Example 5 |
|---|---|---|---|---|---|---|
| (A-1) % by weight | 79.5 | 79.5 | 79.5 | 79.5 | 79.5 | 79.5 |
| (B-1) % by weight | 21.5 | 21.5 | 21.5 | 21.5 | 21.5 | 21.5 |
| (C-1) % by weight | 0.2 | — | — | — | — | — |
| (C-2) % by weight | — | 0.2 | — | — | — | — |
| (C-3) % by weight | — | — | 0.2 | — | — | — |
| (C-4) % by weight | — | — | — | 0.2 | — | — |
| (C-5) % by weight | — | — | — | — | 0.2 | — |
| MFR (g/10 minutes) | 18.1 | 17.6 | 18.4 | 17.1 | 17.9 | 16.3 |
| Flexural modulus (MPa) | 3000 | 3020 | 3040 | 2970 | 3060 | 2890 |
| MD linear expansion coefficient (1/° C.) | 3.8 | 5.0 | 5.0 | 5.2 | 5.1 | 5.5 |
| TD linear expansion coefficient (1/° C.) | 8.8 | 8.9 | 9.0 | 9.1 | 9.0 | 8.4 |
| MD TD average linear expansion coefficient (1/° C.) | 6.3 | 7.0 | 7.0 | 7.2 | 7.1 | 7.0 |
| Difference from the case of no nucleating agent (Comparative Example 5) MD (1/° C.) | −1.7 | −0.5 | −0.5 | −0.3 | −0.4 | Reference |
| Difference from the case of no nucleating agent (Comparative Example 5) TD (1/° C.) | 0.4 | 0.5 | 0.6 | 0.7 | 0.6 | Reference |

TABLE 2

|  | Example 2 | Comparative Example 6 | Comparative Example 7 | Comparative Example 8 | Comparative Example 9 | Comparative Example 10 |
|---|---|---|---|---|---|---|
| (A-1) % by weight | 81.7 | 81.7 | 81.7 | 81.7 | 81.7 | 81.7 |
| (B-2) % by weight | 18.3 | 18.3 | 18.3 | 18.3 | 18.3 | 18.3 |
| (C-1) % by weight | 0.2 | — | — | — | — | — |
| (C-2) %by weight | — | 0.2 | — | — | — | — |
| (C-3) % by weight | — | — | 0.2 | — | — | — |
| (C-4) % by weight | — | — | — | 0.2 | — | — |
| (C-5) % by weight | — | — | — | — | 0.2 | — |
| MFR (g/10 minutes) | 18.3 | 15.7 | 16.7 | 16.8 | 20 | 14.5 |
| Flexural modulus (MPa) | 3240 | 3160 | 3170 | 3450 | 3110 | 2810 |
| MD linear expansion coefficient (1/° C.) | 4.7 | 6.4 | 5.0 | 5.0 | 5.2 | 5.8 |
| TD linear expansion coefficient (1/° C.) | 11.2 | 10.5 | 11.3 | 11.3 | 11.3 | 11 |
| MD TD average linear expansion coefficient (1/° C.) | 8.0 | 8.5 | 8.2 | 8.2 | 8.3 | 8.4 |
| Difference from the case of no nucleating agent (Comparative Example 10) MD (1/° C.) | −1.1 | 0.6 | −0.8 | −0.8 | −0.6 | Reference |
| Difference from the case of no nucleating agent (Comparative Example 10) TD (1/° C.) | 0.2 | −0.5 | 0.3 | 0.3 | 0.3 | Reference |

TABLE 3

|  | Example 3 | Comparative Example 11 | Comparative Example 12 | Comparative Example 13 |
|---|---|---|---|---|
| (A-2) % by weight | 84.5 | 84.5 | 84.5 | 34.5 |
| (B-3) % by weight | 11 | 11 | 11 | 11 |
| Maleic anhydride-modified PP % by weight | 4.5 | 4.5 | 4.5 | 4.5 |
| (C-1) % by weight | 0.2 | — | — | — |

TABLE 3-continued

|  | Example 3 | Comparative Example 11 | Comparative Example 12 | Comparative Example 13 |
|---|---|---|---|---|
| (C-2) % by weight | — | 0.2 | — | — |
| (C-4) % by weight | — | — | 0.2 | — |
| MFR (g/10 minutes) |  |  |  |  |
| Flexural modulus (MPa) | 3780 | 3940 | 3670 | 3350 |
| MD linear expansion coefficient (1/° C.) | 2.2 | 2.6 | 2.7 | 2.8 |
| TD linear expansion coefficient (1/° C.) | 12.0 | 12.4 | 12.1 | 12.0 |
| MD TD average linear expansion coefficient (1/° C.) | 7.1 | 7.5 | 7.4 | 7.4 |
| Difference from the case of no nucleating agent (Comparative Example 13) MD (1/° C.) | −0.6 | −0.2 | −0.1 | Reference |
| Difference from the case of no nucleating agent (Comparative Example 13) TD (1/° C.) | 0.0 | 0.4 | 0.1 | Reference |

TABLE 4

|  | Comparative Example 14 | Comparative Example 15 |
|---|---|---|
| (A-1) % by weight | 100 | 100 |
| (C-1) % by weight | 0.2 | — |
| (C-4) % by weight | — | 0.2 |
| MFR (g/10 minutes) | 20 | 19 |
| Flexural modulus (MPa) | 1880 | 2060 |
| MD linear expansion coefficient (1/° C.) | 8.5 | 7.2 |
| TD linear expansion coefficient (1/° C.) | 10.1 | 10.5 |
| MD TD average linear expansion coefficient (1/° C.) | 9.3 | 8.9 |

TABLE 5

|  | Example 4 | Comparative Example 16 |
|---|---|---|
| (A,3) % by weight | 79.5 | 79.5 |
| (B-1) % by weight | 21.5 | 21.5 |
| (C-1) % by weight | 0.2 | — |
| (C-4) % by weight | — | 0.2 |
| MFR (g/10 minutes) | 48.9 | 46.5 |
| Flexural modulus (MPa) | 2804 | 2718 |
| MD linear expansion coefficient (1/° C.) | 5.7 | 5.8 |
| TD linear expansion coefficient (1/° C.) | 8.8 | 9.6 |
| MD TD average linear expansion coefficient (1/° C.) | 7.2 | 7.7 |
| Difference from Comparative Example 16 MD (1/° C.) | −0.1 | Reference |
| Difference from Comparative Example 16 TD (1/° C.) | −0.8 | Reference |

TABLE 6

|  | Comparative Example 17 | Comparative Example 18 |
|---|---|---|
| (A-1) % by weight | 95 | 95 |
| (B-1) % by weight | 5 | 5 |
| (C-1) % by weight | 0.2 | — |
| (C-4) % by weight | — | 0.2 |
| MFR (g/10 minutes) | 18.3 | 17.9 |
| Flexural modulus (MPa) | 2299 | 2500 |
| MD linear expansion coefficient (1/° C.) | 6.7 | 6.2 |
| TD linear expansion coefficient (1/° C.) | 9.5 | 9.5 |
| MD TD average linear expansion coefficient (1/° C.) | 8.1 | 7.8 |

The invention claimed is:

1. A propylene-based resin composition comprising:
the following component (A);
the following component (B); and
a component (C);
wherein based on a total weight of the component (A) and the component (B), taken as 100 parts by weight, a content of the component (A) is 50 to 89 parts by weight, a content of the component (B) is 11 to 50 parts by weight, and a content of the component (C) is 0.05 to 1 part by weight:
component (A): a propylene homopolymer
component (B): a fibrous filler
component (C): a bis(3,4-dialkylbenzylidene)sorbitol represented by the following formula (1)

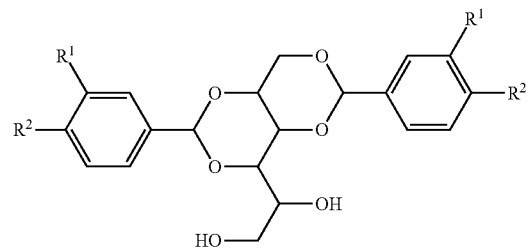

(1)

wherein $R^1$ and $R^2$ each independently of each other represent an alkyl group having 1 to 4 carbon atoms;
wherein the propylene-based resin further comprises a modified polyolefin resin having an MFR measured at 230° C. and under a load of 2.16 kgf of 100 to 400g/10 min.

2. The propylene-based resin composition according to claim 1, wherein the component (B) is an inorganic filler.

3. The propylene-based resin composition according to claim 1, wherein the component (B) is an organic fiber.

4. The propylene-based resin composition according to claim 1, wherein all of $R^1$ and $R^2$ in the above formula (1) are methyl groups.

5. An injection-molded article comprising the propylene-based resin composition according to claim 1.

6. The propylene-based resin composition according to claim 1, wherein a content of constituent units derived from an unsaturated carboxylic acid and/or an unsaturated carboxylic acid derivative contained in the modified polyolefin resin is 0.1% by weight to 20% by weight.

* * * * *